Oct. 30, 1934.   N. H. BREWSTER   1,978,620
SHEET MATERIAL AND METHOD OF MAKING THE SAME
Filed April 30, 1931
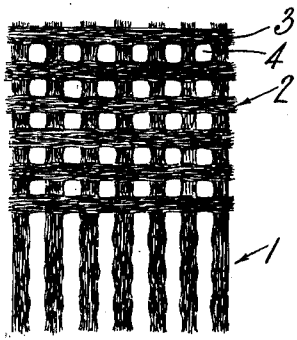
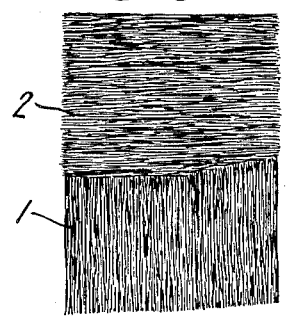
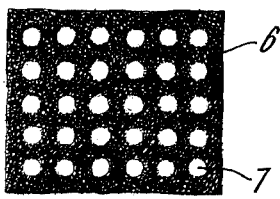
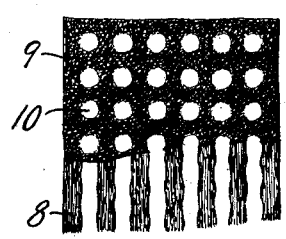
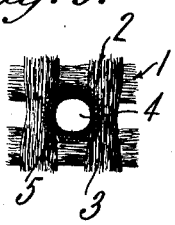
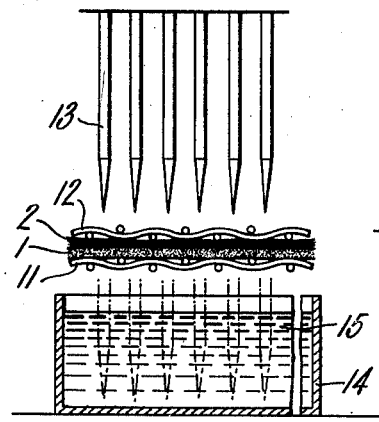
INVENTOR
NEHEMIAH H. BREWSTER
BY
ATTORNEY Patented Oct. 30, 1934

1,978,620

UNITED STATES PATENT OFFICE 1,978,620

SHEET MATERIAL AND METHOD OF MAKING THE SAME

Nehemiah H. Brewster, Brooklyn, N. Y., assignor to The Naugatuck Chemical Company, New York, N. Y., a corporation of Connecticut Application April 30, 1931, Serial No. 533,888

17 Claims. (Cl. 154—2)

This invention relates to a new and useful unwoven sheet material, simulating to some extent a more or less coarsely woven fabric and having a substantial strength crosswise as well as lengthwise of the sheet.

It has for some time been known to produce a weftless fabric by uniting a series of parallel cord-elements such as yarns, threads, cords, rovings and so on in a layer or sheet formation with a binder material such for example as rubber deposited from latex or by means of a calendered sheet of rubber material. It has been suggested to arrange such cord elements in parallel groups and to hold such groups of cord-elements in spaced parallel relationship and in sheet formation by a rubber composition. In such weftless fabrics as above described the strength is for the most part lengthwise of the sheet and only to a very small extent crosswise thereof. To produce a fabric having substantial strength crosswise of the sheet, as well as lengthwise of the sheet it has been suggested to apply a backing to the webbed-together cord-elements of a weftless fabric by placing another series of parallel-cord-elements at right angles to the first parallel cord-elements crosswise of the sheet and secured thereto by a bonding material such as a rubber composition. In this way, as shown in the Hopkinson Patent 1,660,924 dated February 28, 1928, a laminated sheet material is produced with a facing layer of parallel compactly contiguous cord-elements, with a backing of cord-elements at right angles thereto, and a bonding material such as a rubber composition anchoring the cords of the facing layer together and also to the backing. This type of sheet material does give a desired strength cross-wise as well as lengthwise of the sheet and makes a very desirable high grade fabric. Where it is desired to produce an inexpensive unwoven sheet material where strength cross-wise as well as lengthwise of the fabric is desired, and where it is desired to simulate more or less a coarsely woven fabric, this method of applying a backing of cord-elements to a facing layer of parallel contiguous cord-elements by means of a binding material is not commercially feasible.

It is an object of this invention to produce an inexpensive unwoven sheet material, simulating to some extent a more or less coarsely woven fabric, that will have a substantial strength crosswise as well as lengthwise of the sheet. It is a further object of the invention to produce an unwoven sheet material that is flexible and that has a substantial diagonal stretch. Other objects and advantages of the invention will readily appear from the following description.

With the illustrated and described embodiments in mind, but without intention to limit more than is required by the prior art, the invention may be broadly stated to comprise forming a sheet of unwoven fibres in which some of the fibres are disposed at angles to others, perforating the sheet at spaced intervals and retaining the perforations, and any accompanying lateral compacting of the fibres in the vicinity of the perforations, by a binder material.

Several embodiments of the invention are illustrated in the accompanying drawing, in which:

Figure 1, partly cut away to show the different layers, represents a preferred embodiment of the invention as a finished material;

Figure 2 shows the same material before perforating;

Figures 3 and 4 represent various modifications of the preferred embodiment of the invention;

Figure 5 is a vertical section showing an apparatus for producing the product shown in Figure 1; and Figure 6 represents an enlarged view of a portion of the preferred embodiment shown in Figure 1.

In one way of practicing the invention, a layer of fibrous material may be placed on a metal screen or perforated metal sheet. This layer may be composed of haphazardly disposed fibres but is preferably composed of parallel disposed fibres such as a bat or mat of carded or otherwise arranged fibres. Another layer of parallel disposed fibres may be placed on top of and preferably at right angles to the first layer, thus providing a backing for the first or facing layer. The backing may be placed on at angles other than at right angles to the facing layer, and if desired several layers at different angles may be superposed on the facing layer and on one another. When the fibres have been deposited on the screen or perforated plate a top screen or perforated plate with the holes superposed above the holes in the bottom screen or plate may then be placed on top of the uppermost layer of fibres. A series of pins may now be made to pierce through the holes of the top and bottom screens or perforated plates and through the layer or layers of fibrous material therebetween. A binder material may be applied to the fibrous material by maintaining a pan or trough containing the binder material such as an aqueous dispersion of rubber underneath the bottom screen or plate and into which binding material the pins may dip on piercing the fibrous material. When the pins have thus pierced through the top and bottom plates and the fibrous material therebetween, and are being extracted, the binding material adhering to them is wiped off on the fibres in the vicinity of the thus formed perforations and this binds the fibrous material together at the intersections of the various fibres. This piercing of the fibrous material by the pins, which may be regularly spaced in any desired geometrical arrangement lengthwise, crosswise, or diagonally of the sheet, will compact the fibres laterally. The perforations made by the piercing of the pins and the accompanying lateral compacting of the fibres in the vicinity of the perforations will be retained by the binder material. Also some of the fibres from the surface first penetrated by the pins may be drawn to some extent through the perforations and bound to the surrounding fibres in the vicinity of the perforations. If several layers of parallel disposed fibres are used, this piercing of the layers by the pins will also separate the fibres of the various layers into parallel bundles of parallel disposed fibres with the perforations between the various crossed parallel bundles. The piercing of the layers produces a series of perforations and does not produce a solid felted mat as in the needling operations in ordinary felt manufacture. The sheet may then be dried and a sheet material simulating a woven fabric and with cross strength as well as strength lengthwise of the sheet is produced. Such a sheet material will have a great amount of flexibility and a substantial diagonal stretch by virtue of the perforations in the sheet. Without such perforations, as in a sheet of fibres in various directions, whether made up of one or more layers, bound together by a binder material, there will be no appreciable stretch diagonally of the sheet.

Referring more particularly to the drawing, Figure 1 shows a finished sheet material made from two layers 1, 2 of parallel disposed fibres 3 at right angles to each other with the perforations 4 as shown equally spaced in both directions. Figure 2 represents the same material before perforating and shows the same two layers 1, 2 at right angles to each other in the form of bats of parallel disposed fibres. Figure 6 shows in detail the structure of the finished fabric around one of the perforations wherein the same two layers 1, 2 of parallel disposed fibres are shown at right angles to each other and in the vicinity of the perforation 4 the fibres are shown laterally compacted and secured by the binder material as at 5. Figure 3 shows a finished sheet made from a single layer of haphazardly disposed fibres 6 with perforations 7 as shown equally spaced lengthwise and crosswise of the sheet. Figure 4 shows a finished sheet material made from two layers of fibres, the bottom layer 8 of parallel disposed fibres and the top layer 9 of haphazardly disposed fibres with perforations 10 equally spaced as shown lengthwise and crosswise of the sheet. Figure 5 illustrates more or less diagrammatically one apparatus for producing the product shown in Figure 1 and which comprises a screen 11 on which is shown placed two layers of parallel disposed fibres 1, 2 at right angles to each other, as shown in Figure 2, and a second screen 12 placed above the fibres. Above the top screen 12 are shown a series of pins 13 which are arranged to pierce through the superposed holes of the screens 11 and 12 and the layers of fibres 1, 2 between the screens and dip into a pan 14 containing binder material 15 situated underneath the bottom screen. The pins 13 shown in solid lines above the screen 12 pass through the screen and pierce the superposed layers of fibres, laterally compacting the fibres, and drawing fibres from the top surface through the perforations. The pins then dip into the binder material 15 as shown in dotted lines and on extraction from the binder material through the screens to return to the original position as shown in solid lines, wipe off the binder material on the fibres in the vicinity of the perforations.

While the screens or perforated metal sheets have been more or less schematically shown, in practice they may take the form of a foraminous conveyor of the continuous or intermittent type. Where several layers of fibres are superposed on one another, as shown in Figure 1 where there are two layers at right angles to each other, the second or backing layer may be placed on the facing layer manually if desired. In such a case, a continuous layer of parallel fibres may be deposited directly on the conveyor from a garnet machine or carding operation and lengths from another layer of parallel fibres from another carding operation or such may be cut to the width of the first layer and laid side by side across the first layer as it travels along on the conveyor. The backing layer may be placed on the facing layer by means of a machine, such as shown in Hopkinson Patent No. 1,660,924 for applying a backing of parallel cord-elements to a facing layer of cord-elements if desired. To a person skilled in the art, various methods of putting the backing on the facing layer will readily occur.

Various other modifications will readily appear to a person skilled in the art. The various fibres I may use include jute, istle, sisal, manila, cotton, flax and mixtures thereof, and they may be short as well as long fibres. I may have different fibres in different directions or different fibres in different layers if desired. For increasing the strength, I may if desired intersperse the untwisted fibres with cord-elements such as yarns, threads, cords, rovings or any association of fibres resembling the same. In my sheet material made of untwisted fibres, to a great extent the binder material may be considered to replace the twist of the fibres that would make cord-elements. If desired, I may intersperse only some layers with cord-elements or make some layers entirely of cord-elements. It is conceivable that for some special purposes I may desire to produce a sheet material from several layers of cord-elements, perforated, and the cord-elements held together with a binder material. Instead of placing backing layers directly on a facing layer, a binder material may be first sprayed on the facing layer and then also on the backing layer if desired. In such cases, the pins need not dip into a pan or trough of binder material below the conveyor since the binder material will already be present in the fibrous sheet. The binder material may if desired be applied after the perforating step instead of before or during the operation. For a binder material, rubber latex, rubber cement or artificial dispersions of rubber may be used. These rubber dispersions and solutions may be uncompounded, compounded so that they may be vulcanized on subsequent heating or standing or during drying, or they may be already vulcanized as is well known in the art. For various uses, rubber may not be desired, and it is within the scope of my invention to use such other well known binder materials as asphalt and bituminous substances, resins, shellacs, glue, cellulose lacquers, gums, starches and the like. A top screen or perforated plate need not necessarily be used but if the binder material is introduced by the pins dipping into the pan of binder material, such being wiped off by the fibres in the vicinity of the thus formed perforations when the pin is extracted, then a top screen or plate with perforations above the perforations in the bottom plate or conveyor is to be preferred. The size and shape of the pins and the number and spacing will depend to a great extent on the kind of fibre used and to what use the finished material is to be put. For coarser materials and for sheet materials simulating very coarsely woven fabrics such as burlap, large pins spaced far apart will be preferred. For finer materials such as cotton made to simulate less coarsely woven fabrics such as cotton backings for oil cloth and artificial leather materials, smaller pins spaced nearer together may be used. The series of perforations may be in any desired geometrical arrangement, and in this way, sheet materials may be made to simulate a wide variety of woven fabrics.

In view of the many changes and modifications that may be made without departing from the principles underlying the invention, reference should be made to the appended claims for an understanding of the scope of the invention.

Having thus described my invention, what I claim and desire to protect by Letters Patent is:

1. Simulated woven fabric comprising a sheet of fibres with some of the fibres disposed at angles to others and with regularly spaced perforations therethrough and a binder material securing said fibres at least in the vicinity of said perforations to retain said perforations.

2. Simulated woven fabric comprising a sheet of fibres with some of the fibres disposed at angles to others and with regularly spaced perforations therethrough, some surface fibres adjacent said perforations being drawn into the latter, and a binder material securing said fibres at least in the vicinity of said perforations to retain said perforations.

3. Simulated woven fabric comprising a layer of parallel disposed fibres, a layer of fibres adjacent said first layer and having at least a portion of its fibres disposed at angles to the fibres of said first layer, regularly spaced perforations through said layers, and a binder material securing the fibres of said layers at least in the vicinity of said perforations to retain said perforations.

4. Simulated woven fabric comprising a layer of parallel disposed fibres, a layer of fibres adjacent said first layer and having at least a portion of its fibres disposed at angles to the fibres of said first layer, regularly spaced perforations through said layers, some surface fibres adjacent said perforations being drawn into the latter, and a binder material securing the fibres of said layers at least in the vicinity of said perforations to retain said perforations.

5. Simulated woven fabric comprising a layer of parallel disposed fibres, a layer of fibres adjacent said first layer and having at least a portion of its fibres disposed at angles to the fibres of said first layer, regularly spaced perforations through said layers, the fibres of said first layer being compacted laterally into spaced associations of parallel fibres with spaces between the said associations coinciding with said perforations of the sheet, and a binder material securing the fibres of said layers at least in the vicinity of said perforations to retain said perforations and the lateral compacting of the parallel disposed fibres.

6. Simulated woven fabric comprising a layer of parallel disposed fibres, a layer of fibres adjacent said first layer and having at least a portion of its fibres disposed at angles to the fibres of said first layer, regularly spaced perforations through said layers, the fibres of said first layer being compacted laterally into spaced associations of parallel fibres with spaces between the said associations coinciding with said perforations of the sheet, some surface fibres adjacent said perforations being drawn into the latter, and a binder material securing the fibres of said layers at least in the vicinity of said perforations to retain said perforations and the lateral compacting of the parallel disposed fibres.

7. Simulated woven fabric comprising a plurality of layers of parallel disposed fibres, the fibres of one layer being at an angle to the fibres of an adjacent layer, regularly spaced perforations through said layers, and a binder material securing the fibres of said layers at least in the vicinity of said perforations to retain said perforations.

8. Simulated woven fabric comprising a plurality of layers of parallel disposed fibres, the fibres of one layer being at an angle to the fibres of an adjacent layer, regularly spaced perforations through said layers, some surface fibres adjacent said perforations being drawn into the latter, and a binder material securing the fibres of said layers at least in the vicinity of said perforations to retain said perforations.

9. Simulated woven fabric comprising a plurality of layers of parallel disposed fibres, the fibres of one layer being at an angle to the fibres of an adjacent layer, regularly spaced perforations through said layers, the fibres of said layers being compacted laterally into spaced associations of parallel fibres with spaces between the said associations coinciding with said perforations of the sheet, and a binder material securing the fibres of said layers at least in the vicinity of said perforations to retain said perforations and the lateral compacting of the parallel disposed fibres.

10. Simulated woven fabric comprising a plurality of layers of parallel disposed fibres, the fibres of one layer being at an angle to the fibres of an adjacent layer, regularly spaced perforations through said layers, the fibres of said layers being compacted laterally into spaced associations of parallel fibres with spaces between the said associations coinciding with said perforations of the sheet, some surface fibres adjacent said perforations being drawn into the latter, and a binder material securing the fibres of said layers at least in the vicinity of said perforations to retain said perforations and the lateral compacting of the parallel disposed fibres.

11. The method of manufacturing simulated woven fabric which comprises preparing a sheet of unwoven fibrous material with some of the fibres disposed at an angle to other fibres, perforating said sheet, and applying a binder material to said fibrous material at least in the vicinity of said perforations.

12. The method of manufacturing simulated woven fabric which comprises preparing a sheet of fibrous material with some of the fibres disposed at an angle to other fibres, perforating said sheet with regularly spaced perforations, and applying a binder material to said fibrous material at least in the vicinity of said perforations.

13. The method of manufacturing sheet material which comprises preparing a plurality of superposed layers of unwoven fibrous material with some of the fibres of any layer disposed at angles to some fibres of any adjacent layer, applying a binder material, and perforating said layers.

14. The method of manufacturing sheet material which comprises preparing a plurality of superposed layers of unwoven fibrous material with some of the fibres of any layer disposed at angles to some fibres of any adjacent layer, at least one of said layers being of parallel disposed fibres, perforating said layers, and applying a binder material to said fibrous material at least in the vicinity of said perforations.

15. The method of manufacturing sheet material which comprises preparing a plurality of superposed layers of unwoven parallel disposed fibres, the fibres in any layer being at angles to the fibres in an adjacent layer, perforating said layers, and applying a binder material to said fibrous material.

16. The method of manufacturing sheet material which comprises preparing a sheet of unwoven fibrous material with some of the fibres disposed at an angle to other fibres, applying a binder material, and perforating said sheet by piercing the same, whereby some surface fibres adjacent the piercing means are drawn into the sheet.

17. The method of manufacturing sheet material which comprises preparing a sheet of unwoven fibrous material with some of the fibres disposed at an angle to other fibres, perforating said sheet by piercing the same with piercing means with which is associated a binder material whereby some surface fibres adjacent the piercing means are drawn into the sheet, and binder material is applied to the sheet at least in the vicinity of said drawn-in fibres to retain perforations made by said piercing means.

NEHEMIAH H. BREWSTER.